United States Patent [19]

Jones et al.

[11] 4,100,629

[45] Jul. 18, 1978

[54] AIRCRAFT LAVATORY DRAIN PLUG

[75] Inventors: Kendall Jones, North Hollywood; Boyce M. Hill, Los Angeles, both of Calif.

[73] Assignee: Viking Industries, Inc., Chatsworth, Calif.

[21] Appl. No.: 766,017

[22] Filed: Feb. 7, 1977

[51] Int. Cl.² ............................................. A47K 1/14
[52] U.S. Cl. ........................................ 4/295; 4/286; 138/89; 138/96 R
[58] Field of Search ................... 4/286, 287, 293, 295; 138/89, 93, 90, 95, 96 R

[56] References Cited

U.S. PATENT DOCUMENTS

| | | | |
|---|---|---|---|
| 2,924,246 | 2/1960 | Markel | 138/89 |
| 3,130,571 | 4/1964 | Neumann | 138/89 X |
| 3,157,203 | 11/1964 | Ver Nooy | 138/89 |
| 3,428,295 | 2/1969 | Downey et al. | 4/295 X |
| 3,550,636 | 12/1970 | Hearne et al. | 138/89 |
| 3,747,541 | 7/1973 | Reese | 138/89 |
| 3,749,131 | 7/1973 | Burger | 138/89 |

*Primary Examiner*—Henry K. Artis
*Attorney, Agent, or Firm*—Charles H. Schwartz

[57] ABSTRACT

A drain plug for axial insertion into a conduit having an inner surface, including a cup-shaped resilient sealing member having a closed end and an open end and having a sidewall having an outer surface conforming to the inner surface of the conduit and with the cup-shaped member normally axially slideable into the conduit, first means intercoupling the closed and open ends of the cup-shaped member for axially compressing the cup-shaped member to flex the sidewall radially outward to engage and seal against the inner surface of the conduit, and second means coupled to the first means for moving between first and second positions for actuating the first means to compress the cup-shaped member with the second means moved from the first to the second position.

27 Claims, 8 Drawing Figures

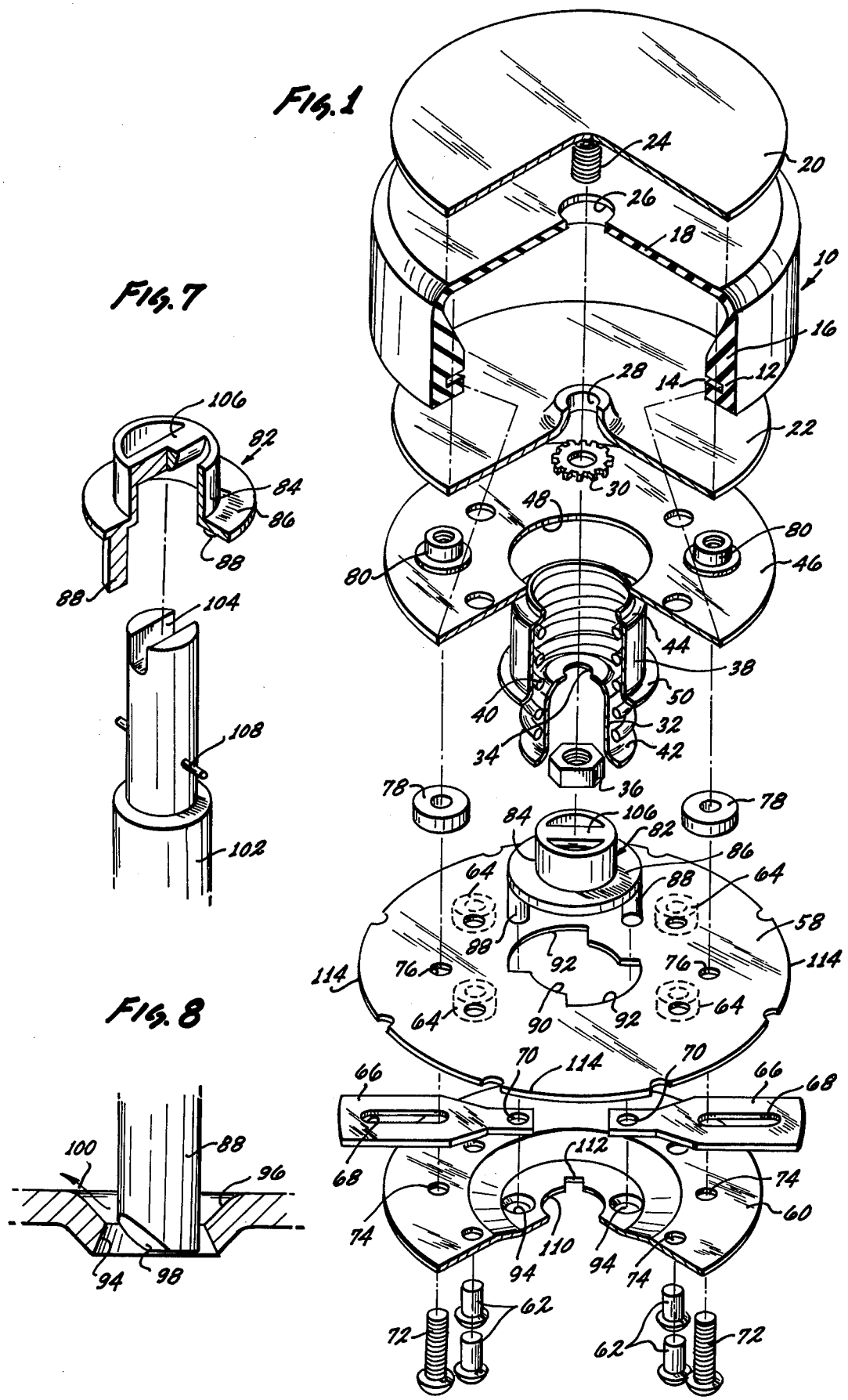

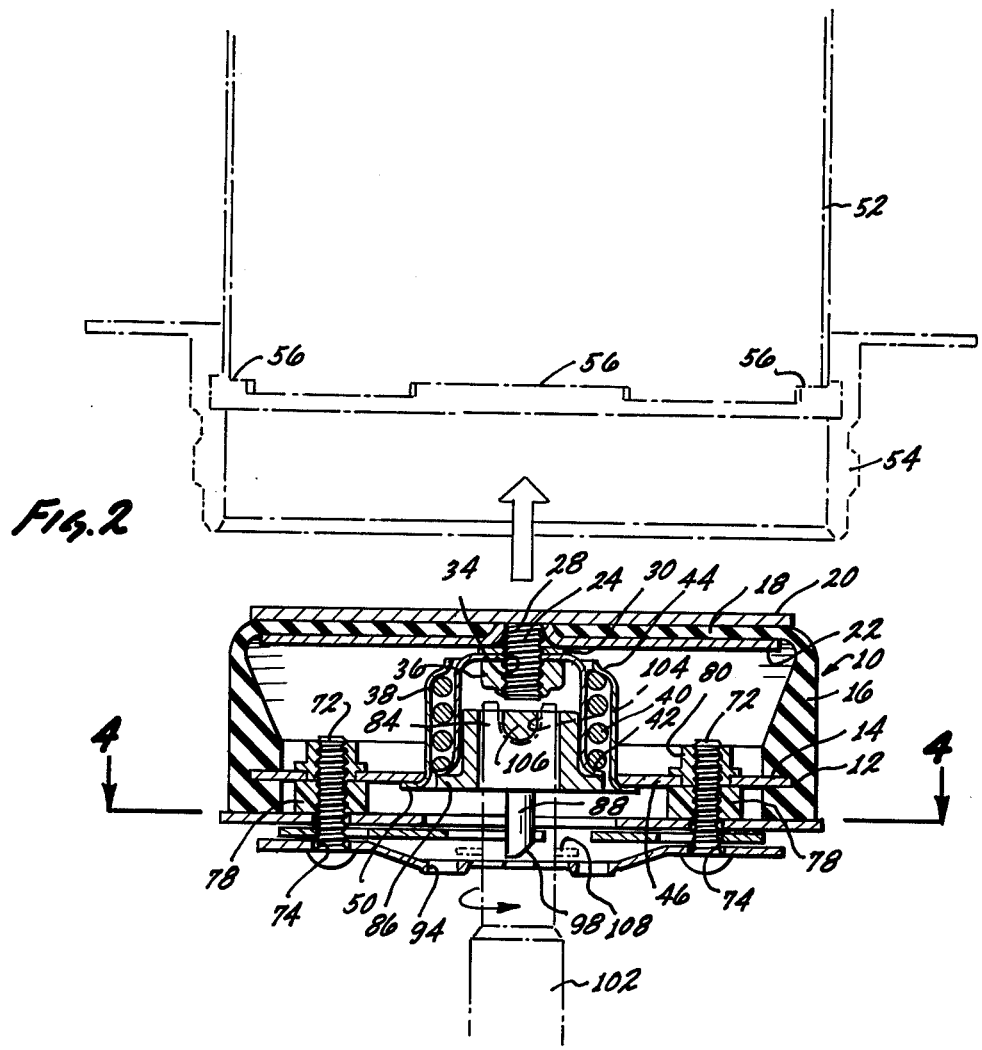
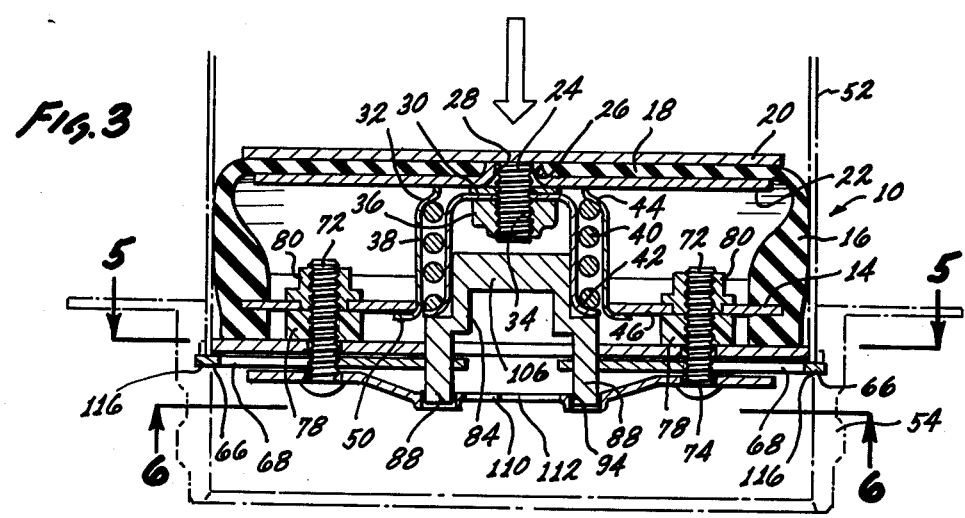

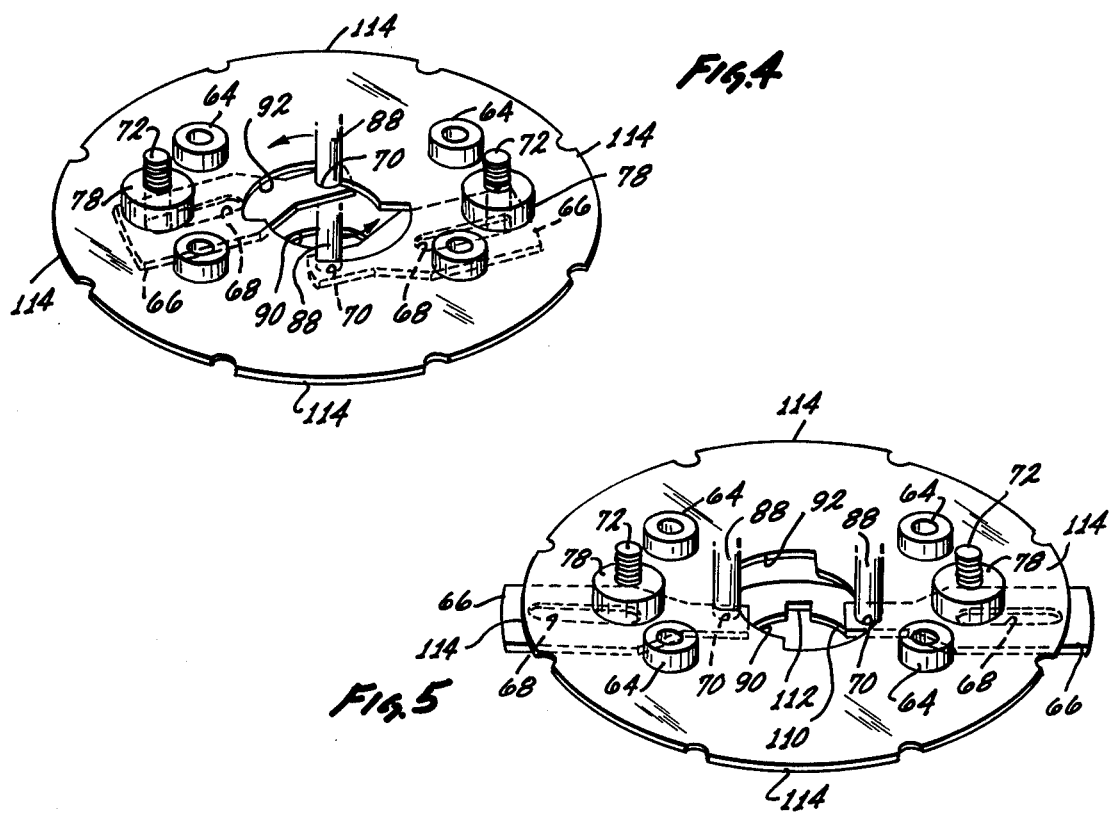
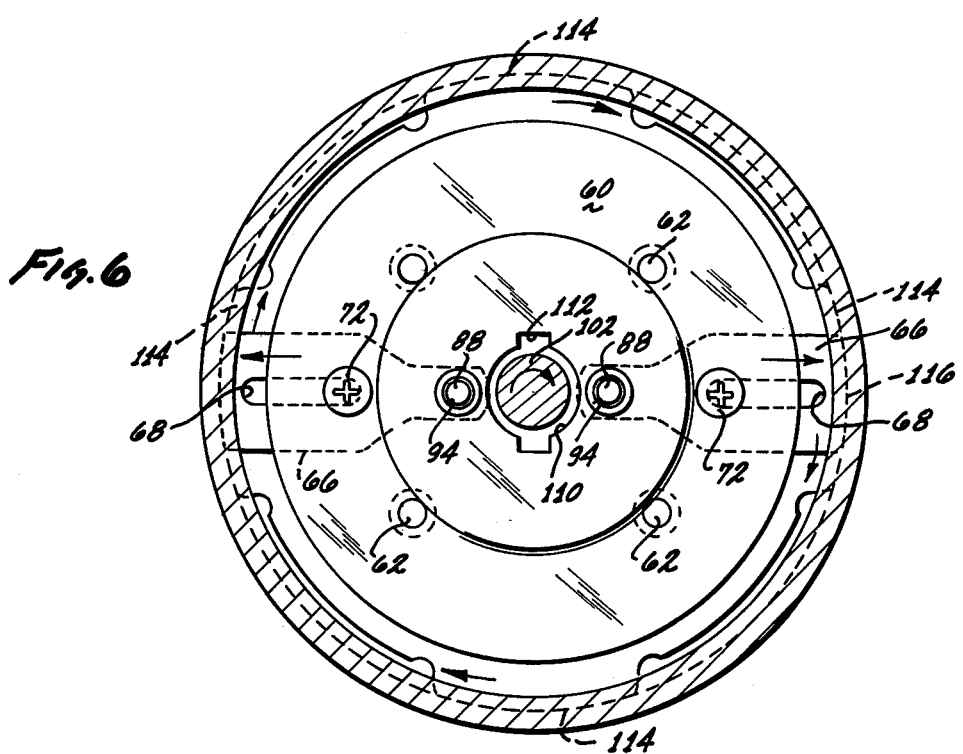

AIRCRAFT LAVATORY DRAIN PLUG

The present invention is directed to an aircraft lavatory drain plug. The drain plug has a locked and unlocked position. In the locked position the drain plug seals the outlet of a conduit leading from an accumulating tank such as when the aircraft is in flight. In the unlocked position, the plug is removable from the conduit to allow for drainage of the accumulated waste in the tank when the aircraft is on the ground and being serviced.

Specifically, the aircraft has a holding tank or tanks which accumulates lavatory waste during flight. The tanks are connected to the outside of the aircraft by a conduit such as a cylindrical conduit extending from the tank to an exterior drain point. The drain plug is inserted into the cylindrical conduit at the drain point to provide for a seal at the end of the conduit and with the drain plug removable to allow for the draining of the tank and also flushing out of the tank at appropriate times. After the tank has been drained, the plug may be reinserted in the cylindrical conduit and locked in position to seal the end of the conduit to allow for the tank to again accumulate waste.

The drain plug must provide for a reliable seal under differing temperature and pressure conditions and must be relatively easy to insert and lock in position and then to unlock and remove so that maintenance personnel can provide for the drainage of the accumulating tank. In addition, the aircraft industry has adopted certain standards in size and configuration so the drain plug of the present invention must be interchangeable with prior art drain plugs to have the same size and configuration and to operate externally in a similar fashion to the prior art drain plugs.

One example of a prior art drain plug includes a doughnut shaped resilient member which is compressed axially to expand the doughnut shaped member radially to seal the plug within the conduit. The doughnut shaped member is compressed using two end plates and the end plates are driven together with a central helical cam member. In addition, the prior art drain plug includes an additional cam provided within a flat plate so as to withdraw or insert two locking ears into recesses in the conduit to lock the drain plug within the conduit. With the drain plug of the prior art, considerable torque is required to drive the central helical cam so as to generate a sufficient axial force to squeeze the doughnut shaped sealing member. Also, the prior art drain plug included a detent pocket in the locked position so as to prevent an inadvertent unlocking of the drain plug while the aircraft is in flight. The initial torque that is required to unlock this detent structure is fairly high. The prior art drain plug also is difficult to unlock when the conduit experiences freezing conditions such as might occur during flight and which persist after landing. It is sometimes necessary to wait until the structure thaws out after landing before the drain plug can be unlocked.

The present invention provides for a drain plug which is externally interchangeable with the prior art drain plugs and which provides for an improved performance over the prior art drain plugs. In addition, the drain plug of the present invention is considerably simpler in structure than the prior art drain plugs. The drain plug of the present invention is provided with a cup-shaped resilient member which has its sidewalls flexed by axial pressure to provide for an expansion of the cup-shaped member radially to seal the drain plug within the conduit. In addition, the drain plug of the present invention uses a caged spring located within the cup-shaped resilient member and cooperating with end plates so as to provide for the initial axial pressure on the cup-shaped member. The drain plug of the present invention is therefore easier to lock in position and requires less force to lock since the force is provided by the caged spring.

In addition, the design of the drain plug of the present invention automatically provides for additional sealing as the pressure in the conduit builds up due to accumulation of waste material in the accumulating tank. The drain plug of the present invention therefore has a self-energizing capability, so that as the pressure on the conduit increases, the pressure capacity of the seal is automatically upgraded without requiring maintenance personnel providing a large manual force during the locking of the drain plug in position in the conduit.

During the unlocking of the drain plug of the present invention, the design eliminates any tendency of the seal to jam itself into the conduit on withdrawal. The drain plug of the present invention is pulled out of the conduit by a seal plate coupled to the cup-shaped member and any tendency of the cup-shaped member to stick causes the cup-shaped member to stretch longer. This, in turn, reduces the diameter of the cup-shaped member and automatically reduces the sticking forces.

In the specific structure of the drain plug of the present invention, the cup-shaped resilient member has its closed end supported on both sides by clamp plates. The open end of the cup-shaped resilient member includes a seal plate supported at the open end of the cup-shaped member. A caged spring is located within the cup-shaped member and between the clamp plates and the seal plate to normally provide an axial force to compress the cup-shaped member and provide for an expansion of the cup-shaped resilient member outward. A locking and unlocking mechanism is provided to overcome the force of the caged spring and specifically manual force is applied with a tool so as to push the clamp plates away from the seal plate to reduce the diameter of the cup-shaped resilient member. The locking mechanism also includes a pair of locking ears which may be moved outward to lock the drain plug within the conduit and which may be retracted to allow for the drain plug to be removed. The locking ears are operated by a toggle mechanism which is an integral part of the locking and unlocking structure.

A clearer understanding of the invention will be had with reference to the following description and drawings wherein FIG. 1 is an exploded view of an aircraft lavatory drain plug constructed in accordance with the teachings of the present invention;

FIG. 2 is a side cross-sectional view of the lavatory drain plug of the present invention ready for insertion into the standard nipple located at the end of the conduit in the aircraft;

FIG. 3 is a cross-sectional view of the drain plug of the present invention locked in position at the end of the conduit;

FIG. 4 illustrates a portion of the locking mechanism taken along lines 4—4 in FIG. 2 and showing the locking ears in the unlocked position;

FIG. 5 illustrates a portion of the locking mechanism taken along lines 5—5 of FIG. 3 showing the locking ears in the locked position;

FIG. 6 illustrates a bottom view of the drain plug of the present invention taken along lines 6—6 of FIG. 3 and showing the locking ears locked within the conduit.

FIG. 7 illustrates the end of the extraction tool and the portion of the locking mechanism which the extraction tool engages; and FIG. 8 illustrates a portion of the locking mechanism illustrating locking pins engaging locking holes in a cover plate.

FIG. 1 illustrates an exploded view of the lavatory drain plug of the present invention. The drain plug includes a resilient cup-shaped member 10 having a sidewall portion 12. A groove 14 extends around the sidewall 12 at the interior of the cup-shaped member 10. The sidewall includes a tapered portion 16 which merges with an end wall 19 which end wall is at a 90° angle to the sidewall 12 when the cup-shaped member is in a relaxed position.

A pair of clamp plates 20 and 22 reinforce and stiffen the end wall 18 of the cup-shaped member 10. Clamp plate 20 includes an integral threaded stud 24 which passes through an opening 26 in the end wall 18. The clamp plate 22 also includes an opening 28 which passes the threaded stud to an interior portion of the cup-shaped member 10.

The threaded stud 24 passes through a washer member 30 and the threaded stud 24 is used to engage one end of a caged spring assembly. The caged spring assembly includes an inner guide member 32 which has an opening 34 to receive the threaded stud 24. A nut member 36 locks the inner guide to the threaded stud 24. The caged spring assembly also includes an outer guide 38 and a helical spring 40 is maintained between the inner and outer guides 32 and 38 and the helical spring is specifically retained between shoulder portions 42 and 44 of the inner and outer guides.

A seal plate 46 fits within the groove 14 in the cup-shaped member 10 and the plate 46 includes a large opening 48 to pass the body of the outer guide member 38 except for a flange portion 50. It can be seen, therefore, that the helical spring 40 normally pushes the inner guide member 32 downward as shown in FIG. 3 so as to provide axial movement of the clamp plates 20 and 22 toward the seal plate 46 and thereby flex the portion 16 of the cup-shaped resilient member 10 radially outward to provide for a seal. Specifically, the lavatory drain plug would normally be inserted into the end of a conduit 52 which leads from the accumulating tank in the aircraft. A nipple member 54 is positioned at the end of the conduit 52 to receive the lavatory drain plug. The conduit and nipple include castellated portions 56 which receive complementary portions in the drain plug to aid in the locking and unlocking of the drain plug at the end of the conduit.

The lavatory drain plug of the present invention includes a locking mechanism to flex the resilient cup-shaped member 10 to either a sealed position or an unsealed position in accordance with the axial distance between the clamp plates which support the end of the cup-shaped member and the seal plate 46. The locking mechanism includes a base plate 58 and a keyhole plate 60 which are permanently assembled together in spaced relation by rivets 62. The spacing between the plates 58 and 60 is provided by spacers 64.

A pair of locking ears 66 are positioned between the plates 58 and 60 and provide for a locking of the drain plug at the end of the conduit in addition to the sealing provided by the cup-shaped member 10. Each locking ear includes an elongated slot 68 and an opening 70 and operates by a toggle action of the locking ears to move the locking ears from the retracted position as shown in FIG. 4, to the extended position, as shown in FIG. 5. The locking ears are held in position between the plate members 58 and 60 by bolts 72 which extend through openings 74 in the plate member 60, through the elongated slot 68, and through openings 76 in the plate member 58. Spacing washers 78 are positioned in between the plate member 58 and the plate member 46 and over the bolts 72 to provide spacing between these plate members. In addition, the plate member 46 includes integral nut portions 80 to receive the bolts 72 to secure the locking structure to the end of the drain plug.

The final element in the locking structures includes a control shaft 82 which has an upper cylindrical portion 84 positioned within the body of the inner guide member 32. The control shaft 82 also has a flanged portion 86 which supports the lower shoulder 42 of the inner guide member 32. Extending from the flanged portion 86 are a pair of axial pins 88 which extend through a large shaped opening 90 in the plate member 58. Specifically, the opening 90 includes control path portions 92 which receive the pins 88 and which limit the rotational movement of the control shaft 82 to approximately 90°. The ends of the path 92 provide for stops so that the control shaft 92 may only be rotated a total of 90° from one stop position to the other stop position.

The pin members 88 also extend through the openings 70 in the locking ears 66 to control the toggling of the locking ears 66 from the retracted position shown in FIG. 4 to the extended position shown in FIG. 5 as the control shaft is rotated through 90°. The keyhole plate 60 also includes a pair of openings 94 which receive the ends of the pin members 88 when the drain plug is in the locked position. The openings 94 are beveled downward such as by dimpling each opening 94 at position 96 and the end of the pins 88 also have beveled portions 98 complementary to the openings 94. The beveling and dimpling facilitates the removal of the pins 88 from the openings 94 upon rotation of the control shaft 82 as shown by the arrow 100 in FIG. 8.

The rotation of the control shaft 82 is provided by an extraction tool 102 the operative end of which is shown in FIG. 7. The tool 102 includes a slot 104 which cooperates with a bar portion 106 of the control shaft 82 and which extends across the cylindrical portion 84 of the control shaft 82. The extraction tool 102 also includes a pin 108 extending through the tool 102. The pin 108 provides for the proper positioning of the tool 102 to engage the control shaft 82 and also ensures that when the tool 102 engages the control shaft and is rotated the drain plug is retained on the end of the tool. The positioning and retaining are accomplished through the use of a keyhole opening 110 in the keyhole plate 60 which opening 110 includes keyways 112 to pass the pin 108 and the tool 102 when the tool is in the proper position. Once the tool 102 is inserted with the pin 108 complementary to the keyways 112 and the tool is then rotated to rotate the control shaft 82, the pin 108 is then retained between the plate 60 and the plate 58 so that the drain plug is retained on to the end of the tool 102.

In order to ensure that the drain plug when inserted into the conduit is properly seated and can provide for locking and unlocking, the base plate 58 has portions 114 which extend outwardly and which are received in the castellated portions 56 at the end of the conduit. In this way, when the drain plug is inserted, the base plate is locked against rotational movement when the portions 114 are seated in the castellated portions 56.

In the unlocked position for the drain plug as shown in FIG. 2, the drain plug is retained at the end of the tool 102 and with the pins 88 in the rotated position so as to be free of the openings 94. In this position the caged spring 40 is compressed and the clamp plates 20 and 22 are extended away from the seal plate 46. The cup-shaped sealing member 10 therefore has its outer diameter slightly smaller than the inner diameter of the conduit 52. The drain plug is then inserted through the nipple portion 54 into the conduit 52 and with the portions 114 of the base plate seated in the castellated portions 56. In addition, the locking ears 66 are in the retracted position shown in FIG. 4.

Once the drain plug is seated within the conduit and is prevented from rotation, the tool 102 may be rotated to toggle the locking ears into the extended position as shown in FIG. 5 and, at the same time, to allow the pin members 88 to enter into the openings 94. At that time as shown in FIG. 3, the helical spring 40 exerts pressure within the caged arrangement to push the inner and outer guides 32 and 38 away from each other and to draw the clamp plates 20 and 22 towards the seal plate 19. The cup-shaped resilient member 10 is then flexed outward to engage the inner walls of the conduit 52. The drain plug is self-activating since pressure against the plate member 20 by the build up of pressure in the conduit 52 and in the accumulating tank merely produces additional axial movement of the end wall of the cup-shaped resilient member 10 to provide for further radial pressure against the walls of the conduit. Therefore as pressure builds up in the conduit, this pressure produces additional sealing. The bottom of the flange portion 86 of the control shaft 84 and the top of the plate 58 provide for a stop to limit the axial movement of the clamp plates 20 and 22 so that the sealing is limited to a predetermined level. The drain plug is prevented from blow-out because of the locking ears 66 engaging a groove 116 in the nipple 54.

Unlocking of the drain plug from the conduit to allow drainage of the waste in the accumulating tank is accomplished by inserting the extraction tool 102 through the keyhole 110 to engage the control shaft 84. The tool is then rotated to rotate the control shaft to remove the pins 88 from the openings 94 which, in turn, compresses the caged spring 40 and allows for the clamp plates 20 and 22 to move in a direction away from the seal plate 46. At the same time, the locking ears 66 are retracted and the drain plug may then be removed. Any tendency of the drain plug to jam during withdrawal is eliminated since any sticking of the cup-shaped member causes the cup-shaped member to stretch which, in turn, reduces its diameter and thereby reduces any sticking forces.

The present invention, therefore, provides for a lavatory drain plug which is simple to insert and remove from the conduit and which is simpler in operation and requires less force to operate than the prior art drain plugs. In addition, additional pressure in the conduit against the drain plug merely provides for self-actuation, so that the drain plug provides for additional sealing. The drain plug of the present invention also includes a visual inspection to ensure that the plug is properly sealed since the ends of the pins 88 are visible through the openings 94 at the bottom of the plug. The maintenance personnel therefore can make this visual inspection to ensure that the plug is properly sealed in position. In addition, during the locking of the plug as the control shaft is rotated, the final rotation provides for the pins 88 entering into the openings 94 and then moving axially. This produces a small kick to the tool 102 which is an indication to the maintenance personnel that the drain plug has been properly locked and sealed in position.

Although the invention has been described with reference to a particular embodiment, it is to be appreciated that various adaptations and modifications may be made and the invention is only to be limited by the appended claims.

We claim:

1. A drain plug for axial insertion into a conduit having an inner surface, including a cup-shaped resilient member having a closed end and an open end and having a sidewall having an outer surface and conforming in configuration to the inner surface of the conduit and with the thickness of the sidewall tapering at the inner wall of the member from the open end to the closed end and thicker at the open end and with the cup-shaped member in a relaxed state slidable into the conduit and in a compressed state having at least the portion of the sidewall adjacent the closed end flexed radially outward and sealed against the inner surface of the conduit, a first clamp plate disposed on the outer surface of the closed end of the cup-shaped member, a seal plate disposed to close the open end of the cup-shaped member and spaced from the first clamp plate, sealing means intercoupling the first clamp plate and the seal plate for providing relative axial movement of the clamp plate and the seal plate for providing a first spaced relationship between the clamp and the seal plates with the cup-shaped member in the compressed state and for providing a second spaced relationship between the clamp and the seal plates with the cup-shaped member in the relaxed state.

2. The drain plug of claim 1 additionally including a second clamp plate disposed on the inner surface of the closed end of the cup-shaped member and with the first and second clamp plates clamping the closed end to form a rigid structure to facilitate the flexing of the sidewall axially outward.

3. The drain plug of claim 1 wherein the cup-shaped member has a grooved portion at the open end to receive the seal plate.

4. The drain plug of claim 1 wherein the sealing means includes a spring caged between inner and outer guide members and with the guide members coupled to the clamp plate and the seal plate and with the spring providing a force for normally producing movement of the clamp plate and the seal plate toward each other to the first spaced relationship and additionally including means for providing movement of the clamp plate and the seal plate away from each other to the second spaced relationship.

5. The drain plug of claim 4 wherein the additional means is rotationally actuated between two positions for controlling the axial movements of the clamp plate and the seal plate between the first and second spaced relationships.

6. The drain plug of claim 5 additionally including locking ears coupled to and actuated by the additional means and with the locking ears toggled to a locking position within the conduit upon rotation of the additional means.

7. The drain plug of claim 1 additionally including rotational actuating means coupled to the sealing means for providing the relative axial movement of the clamp plate and the seal plate to the first and second spaced relationships upon rotation of the actuating means.

8. The drain plug of claim 7 additionally including locking ears coupled to and actuated by the actuating means and with the locking ears toggled to a locking position within the conduit upon rotation of the actuating means.

9. The drain plug of claim 1 wherein the cup-shaped member is self-energizing by the energy generated by pressure in the conduit against the first clamp plate and additionally including a stop means to limit the compression of the cup-shaped member in accordance with any build-up of pressure in the conduit.

10. A drain plug for axial insertion into a conduit having an inner surface, including
    a cup-shaped resilient sealing member having a closed end and an open end and having a sidewall having an outer surface conforming in configuration to the inner surface of the conduit and with the thickness of the sidewall tapering at the inner wall of the member from the open end to the closed end and thicker at the open end and with the cup-shaped member normally axially slidable into the conduit,
    first means intercoupling the closed and open ends of the cup-shaped member for axially compressing the cup-shaped member to flex at least the portion of the sidewall adjacent the closed end radially outward to engage and seal against the inner surface of the conduit, and
    second means coupled to the first means for moving between first and second positions for actuating the first means to compress the cup-shaped member with the second means moved from the first to the second position.

11. The drain plug of claim 10 wherein the first means includes a clamp plate disposed on the outer surface of the closed end of the cup-shaped member and with axial movement of the clamp plate providing flexing of the sidewall radially outward.

12. The drain plug of claim 11 additionally including a second clamp plate disposed on the inner surface of the closed end of the cup-shaped member and with the first and second clamp plates clamping the closed end to form a rigid structure to facilitate the flexing of the sidewall radially outward.

13. The drain plug of claim 10 wherein the cup-shaped member has a grooved portion at the open end to receive a seal plate and with a clamp plate disposed on the outer surface of the closed end with the first means coupled to the seal plate and the clamp plate.

14. The drain plug of claim 13 wherein the sealing means includes a spring caged between inner and outer guide members and with the guide members coupled to the clamp plate and the seal plate and with the spring providing a force for normally producing movement of the clamp plate and the seal plate toward each other to a first spaced relationship compressing the cup-shaped member and with the second means for providing movement of the clamp plate and the seal plate away from each other to a second spaced relationship.

15. The drain plug of claim 14 wherein the second means is rotationally moved between two positions for controlling the axial movements of the clamp plate and the seal plate between the first and second spaced relationships.

16. The drain plug of claim 15 additionally including locking ears coupled to and actuated by the second means and with the locking ears toggled to a locking position within the conduit upon rotation of the second means.

17. The drain plug of claim 13 wherein the movement of the second means is rotational for providing axial movement of the clamp plate and the seal plate to the first and second spaced relationships upon rotation of the second means.

18. The drain plug of claim 17 additionally including locking ears coupled to and actuated by the second means and with the locking ears toggled to a locking position within the conduit upon rotation of the second means.

19. The drain plug of claim 10 wherein the cup-shaped member is self-energizing by the energy generated by the pressure in the conduit against the closed end of the cup-shaped member and additionally including a stop means to limit the compression of the cup-shaped member in accordance with any build-up of pressure in the conduit.

20. A drain plug for axial insertion into a conduit having an inner surface, including
    a cup-shaped resilient member having a closed end and an open end and having a sidewall having an outer surface conforming to the inner surface of the conduit and with the cup-shaped member in a relaxed state slidable into the conduit and in a compressed state having the sidewall flexed radially outward and sealed against the inner surface of the conduit,
    a first clamp plate disposed on the outer surface of the closed end of the cup-shaped member,
    a seal plate disposed to close the open end of the cup-shaped member and spaced from the first clamp plate,
    sealing means intercoupling the first clamp plate and the seal plate for providing relative axial movement of the clamp plate and the seal plate for providing a first spaced relationship between the clamp and the seal plates with the cup-shaped member in the compressed state and for providing a second spaced relationship between the clamp and the seal plates with the cup-shaped member in the relaxed state, and
    wherein the sealing means includes a spring caged between inner and outer guide members and with the guide members coupled to the clamp plate and the seal plate and with the spring providing a force for normally producing movement of the clamp plate and the seal plate toward each other to the first spaced relationship and additionally including means for providing movement of the clamp plate and the seal plate away from each other to the second spaced relationship.

21. The drain plug of claim 20 wherein the additional means is rotationally actuated between two positions for controlling the axial movements of the clamp plate and the seal plate between the first and second spaced relationship.

22. The drain plug of claim 21 additionally including locking ears coupled to and actuated by the additional means and with the locking ears toggled to a locking position within the conduit upon rotation of the additional means.

23. The drain plug of claim 20 wherein the cup-shaped member is self-energizing by the energy generated by pressure in the conduit against the first clamp plate and additionally including a stop means to limit the compression of the cup-shaped member in accordance with any build-up of pressure in the conduit.

24. A drain plug for axial insertion into a conduit having an inner surface, including
a cup-shaped resilient sealing member having a closed end and an open end and having a sidewall having an outer surface conforming to the inner surface of the conduit and with the cup-shaped member normally axially slidable into the conduit;
first means intercoupling the closed and open ends of the cup-shaped member for axially compressing the cup-shaped member to flex the sidewall radially outward to engage and seal against the inner surface of the conduit,
second means coupled to the first means for moving between first and second positions for actuating the first means to compress the cup-shaped member with the second means moved from the first to the second position, and
the cup-shaped member has a grooved portion at the open end to receive a seal plate and with a clamp plate disposed on the outer surface of the closed end with the first means coupled to the seal plate and the clamp plate, and including a spring caged between inner and outer guide members and with the guide members coupled to the clamp plate and the seal plate and with the spring providing a force for normally producing movement of the clamp plate and the seal plate toward each other to a first spaced relationship compressing the cup-shaped member and with the second means for providing movement of the clamp plate and the seal plate away from each other to a second spaced relationship.

25. The drain plug of claim 24 wherein the second means is rotationally moved between two positions for controlling the axial movements of the clamp plate and the seal plate between the first and second spaced relationships.

26. The drain plug of claim 25 additionally including locking ears coupled to and actuated by the second means and with the locking ears toggled to a locking position within the conduit upon rotation of the second means.

27. The drain plug of claim 24 wherein the cup-shaped member is self-energizing by the energy generated by the pressure in the conduit against the closed end of the cup-shaped member and additionally including a stop means to limit the compression of the cup-shaped member in accordance with any build-up of pressure in the conduit.

* * * * *